3,074,993
PHOSPHOROTRIAMIDOHALIDOTHIOATES
Henry Tolkmith, Midland, Mich., assignor to The Dow Chemical Company, Midland, Mich., a corporation of Delaware
No Drawing. Filed Apr. 2, 1962, Ser. No. 184,530
9 Claims. (Cl. 260—461)

The present invention is directed to phosphorotriamidohalidothioates and methods for their production. In general, the phosphorotriamidohalidothioates are represented by the following formula:

$$[(X)_3{\equiv}P{-}S{-}R]^+ \text{Halogen}^-$$

In this and succeeding formulae, R is lower alkyl, allyl or benzyl and the X's are amino, lower alkylamino, piperidino, cyclohexylamino or benzylamino. In the present specification and claims, the expression "lower alkyl" is employed to refer to radicals containing not in excess of 5 carbon atoms such as methyl, ethyl, propyl and butyl. These compounds are novel crystalline substances which are to a varying degree soluble in many common organic solvents and water. The compounds are useful as parasiticides and herbicides and are adapted to be employed for the control of many plants, mites, insects and bacterial and fungal organisms such as worms, beetles, aphids, radishes, ascarids, intestinal worms, flies, millet and mustard.

The new compounds of the present invention are prepared in a novel method which comprises causing a reaction between a phosphorotriamidothioate having the formula $$(X)_3{\equiv}P{=}S$$

and a halide compound having the formula:

R—Halogen

The invention conveniently can be carried out in an excess of the halide compound as reaction medium or in an organic liquid including inert solvents such as nitromethane, nitrobenzene, halogenated aromatic compounds or organic ethers. The amounts of the reagents to be employed are not critical, some of the desired product being obtained when employing any proportion of the reagents. In the preferred method of operation, good results are obtained when reacting substantially equimolecular proportions of the phosphorotriamidothioate and halide materials. The reaction takes place smoothly at a temperature of from 20° to 120° C. with the production of the desired phosphorotriamidohalidothioate product. The reaction can be carried out under superatomspheric pressure and is so effected when employing low boiling alkyl halides and solvents. In effecting the reaction between the phosphorotriamidothioate and halide materials, it is critical that the materials are mixed and contacted together in any convenient fashion and the resulting mixture maintained with agitation for a period of time such that phosphorotriamidohalidothioate product is produced in the reaction zone. Good results are obtained when the mixture is maintained in the reaction temperature range for at least five minutes and preferably for about one or more hours, the periods being dependent upon the employed temperature and phosphorotriamidothioate reagent. When employing a phosphorotriamidothioate containing one or more primary amino moieties or ammonium as substituents, the reaction system is heterogeneous and reaction periods of 10 hours and longer are required to produce appreciable quantities of the desired products. With such heterogeneous systems, periods up to 250 or more hours are sometimes employed depending upon the chosen operating temperature. When employing a phosphorotriamidothioate containing solely secondary amino moieties as substituents, the reactants and reaction medium in the presence of suitable solvent or excess alkyl halide form a homogeneous system, and the reaction takes place in from about five minutes to two hours depending upon the operating temperature. Thus, in a preferred procedure, the reaction is carried out in the presence of excess alkyl halide as reaction medium.

Following the reaction, the desired product is separated and purified by conventional procedures such as dilution with an organic solvent to precipitate the desired product, filtration, decantation, extraction with a suitable organic solvent and recrystallization from various organic solvents.

The following examples merely illustrate the present invention and are not to be construed as limiting.

*Example 1.—S-Methyl Hexamethyl Phosphorotriamidoiodidothioate*

Two parts by weight of hexamethyl phosphorotriamidothioate was mixed with 15 parts of methyl iodide and the resulting mixture maintained with stirring for 15 hours at a temperature of 25° C. During this period, the S-methyl hexamethyl phosphorotriamidoiodidothioate product precipitated in the reaction mixture as a crystalline solid. This product was separated by filtration, the separated product dissolved in dimethylformamide and the dimethyformamide solution diluted with diethyl ether to reprecipitate the product. The reprecipitated product was isolated by filtration and obtained in a yield of 80.2 percent based upon the phosphorotriamidothioate starting material. The product melted at 143°–145° C. and had an iodine content of 37.2 percent as compared to a theoretical content of 37.65 percent.

In a further operation, the same reaction system was maintained at the boiling temperature (40° C.) for 2 hours. In such operation, the S-methyl hexamethyl phosphorotriamidoiodidothioate product was obtained in a yield of about 94 percent.

*Example 2.—S-Allyl Phosphorotriamidobromidothioate*

Two parts by weight of phosphorotriamidothioate and 11 parts of allyl bromide were mixed together and the resulting mixture heated at the boiling temperature (70° C.) and with stirring for a period of 125 hours. During the heating period, the S-allyl phosphorotriamidothioate product was produced in the reaction mixture. Following the heating period, the reaction mixture was diluted with 500 milliliters of diethyl ether and the diluted mixture filtered to obtain the desired product as a crystalline solid in a yield of 97 percent based upon the phosphorotriamidothioate starting reagent. This product melted at 171°–172° C. and had a nitrogen content of 18.35 percent as compared to a theoretical content of 18.1 percent.

*Example 3.—S-n-Propyl N,N',N''-Tricyclohexyl Phosphorotriamidobromidothioate*

Two parts by weight of N,N',N''-tricyclohexyl phosphorotriamidothioate and 7 parts of n-propyl bromide were mixed together and heated at the boiling temperature (71° C.) with stirring and under reflux for 170 hours. During this period, an S-n-propyl N,N',N''-tricyclohexyl phosphorotriamidobromidothioate product was produced in the reaction zone. Following the refluxing period, the reaction mixture was concentrated by distilltaion under somewhat reduced pressure and the residue thereafter washed with ether to obtain the S-n-propyl N,N',N''-tricyclohexyl phosphorotriamidobromidothioate product as a crystalline solid melting at 128°–130° C. This product was obtained in a yield of 98 percent and had a bromine content of 16.6 percent as compared to a theoretical content of 16.63 percent.

In exactly analogous fashions, the following products of the present invention were obtained:

| | Reaction Temperature (° C.) | Reaction Time (Hours) | Melting Point (° C.) | Percent Halogen Content |
|---|---|---|---|---|
| S-Ethyl hexamethyl phosphorotriamidoiodidothioate | 50 | 40 | 131-133 | 35.4 |
| S-Methyl diethyltetramethyl phosphorotriamidoiodidothioate | 25 | 16 | 103-105 | 34.5 |
| S-Methyl tetramethyl piperidino phosphorotriamidoiodidothioate | 45 | 60 | 130-132 | 36.7 |
| S-Ethyl phosphorotriamidoiodidothioate | 72 | 100 | 162-163 | 47.6 |
| S-Propyl phosphorotriamidobromidothioate | 71 | 100 | 163-164 | 34.5 |
| S-Benzyl phosphorotriamidochloridothioate | 95 | 130 | 144-146 | 14.7 |
| S-Methyl phosphorotriamidoicdidothioate | 45 | 100 | 159-160 | 49.4 |
| S-Ethyl N,N',N''-trimethyl phosphorotriamidoiodidothioate | 73 | 160 | 52-54 | 41.1 |
| S-Ethyl N,N',N''-triethyl phosphorotriamidoiodidothioate | 73 | 110 | 72-74 | 35.9 |
| S-Ethyl N,N',N''-tricyclohexyl phosphorotriamidoiodidothioate | 73 | 110 | 144-145 | 24.1 |
| S-Ethyl N,N',N''-tribenzyl phosphorotriamidoiodidothioate | 73 | 170 | 104-106 | 23 |
| S-n-Propyl N-ethyl phosphorotriamidobromidothioate | 70 | 250 | 142-144 | 30.7 |
| S-Propyl N,N',N''-trimethyl phosphorotriamidobromidothioate | 70 | 200 | 74-76 | 29.1 |
| S-n-Propyl N,N',N''-tribenzyl phosphorotriamidobromidothioate | 71 | 115 | 112-113 | 16.1 |
| S-Isopropyl N,N',N''-trimethyl phosphorotriamidobromidothioate | 63 | 160 | 98-100 | 28.7 |
| S-Isopropyl N,N',N''-tricyclohexyl phosphorotriamidobromidothioate | 63 | 160 | 120-122 | 16.4 |
| S-Isopropyl N,N',N''-tribenzyl phosphorotriamidobromidothioate | 63 | 115 | 122-124 | 15.9 |
| S-Allyl N,N',N''-trimethyl phosphorotriamidobromidothioate | 70 | 170 | 86-88 | 30.0 |
| S-Allyl N,N',N''-tricyclohexyl phosphorotriamidobromidothioate | 71 | 170 | 112-114 | 16.9 |
| S-Benzyl N,N',N''-trimethyl phosphorotriamidochloridothioate | 75 | 170 | 156-158 | 12.8 |

The new compounds of the present invention are useful as herbicides and parasiticides for the control of a number of plants, mites, insects, nematodes, intestinal worms and bacterial and fungal organisms. For such use, the products are dispersed on a finely divided solid and employed as dusts. Such dust products may be dispersed in water together with a surface active agent and the resulting aqueous compositions employed as sprays. In other procedures, the products are employed as constituents of solvent solutions, oil-in-water or water-in-oil emulsions or water dispersions with or without the addition of wetting, dispersing or emulsifying agents. In representative operations, aqueous compositions containing 20 parts per million by weight of S-n-propyl N,N',N''-tricyclohexyl phosphorotriamidobromidothioate give excellent and substantially complete controls of coontail. In further operations, compositions containing 0.12 percent by weight of S-methyl hexamethyl phosphorotriamidoiodidothioate or S-n-propyl N,N',N''-tricyclohexyl phosphorotriamidobromidothioate give substantially complete controls of ascarids.

The phosphorotriamidothioates employed as starting materials in accordance with the present invention are prepared in known methods by reacting phosphorus thiochloride with ammonia or an amine such as cyclohexylamine, dicyclohexylamine, benzylamine, dibenzylamine, piperidine or a lower alkylamine including methylamine, dimethylamine, diamylamine, etc. In such operations, the phosphorus thiochloride is reacted with one amine compound to introduce the same amino moiety into the molecule, or successively with two or three different amine compounds to introduce two or three different amino moieties into the molecule. The reaction takes place readily at temperatures of from −20° to +120° C. with the production of the desired product and amine hydrochloride of reaction. Following the reaction, the desired product is separated by conventional procedures.

What is claimed is:

1. The phosphorotriamidohalidothioate having the formula $$[(X)_3 \equiv P-S-R]^+ Y^-$$

wherein X represents cyclohexylamino, R represents a member of the group consisting of lower alkyl and allyl and Y represents halogen.

2. The method for the manufacture of a phosphorotriamodohalidothioate having the formula $$[(X)_3 \equiv P-S-R]^+ Y^-$$

which comprises causing a reaction between a phosphorotriamidothioate having the formula $$(X)_3 \equiv P=S$$

and a halide compound having the formula $$R-Y$$

wherein in the formulae, the X's represent a member of the group consisting of amino, lower alkylamino, benzylamino, cyclohexylamino and piperidino, R represents a member of the group consisting of lower alkyl, allyl and benzyl and Y represents halogen.

3. A method claimed in claim 2 wherein the halogen is bromide.

4. A method claimed in claim 2 wherein R is lower alkyl and X is amino.

5. A method claimed in claim 2 wherein R is lower alkyl and X is lower alkylamino.

6. S-ethyl N,N',N''-tricyclohexyl phosphorotriamidoiodidothioate.

7. S-isopropyl N,N',N''-tricyclohexyl phosphorotriamidobromidothioate.

8. S-allyl N,N',N''-tricyclohexyl phosphorotriamidobromidothioate.

9. S-n-propyl N,N',N''-tricyclohexyl phosphorotriamidobromidothioate.

No references cited.